3,326,240
REGULATOR AND CONTROL FOR A FLUID OPERATED DEVICE
Harold O. McConnaughay, Batavia, Ill., assignor to Skil Corporation, Chicago, Ill., a corporation of Delaware
Filed Aug. 3, 1964, Ser. No. 386,988
5 Claims. (Cl. 137—637.4)

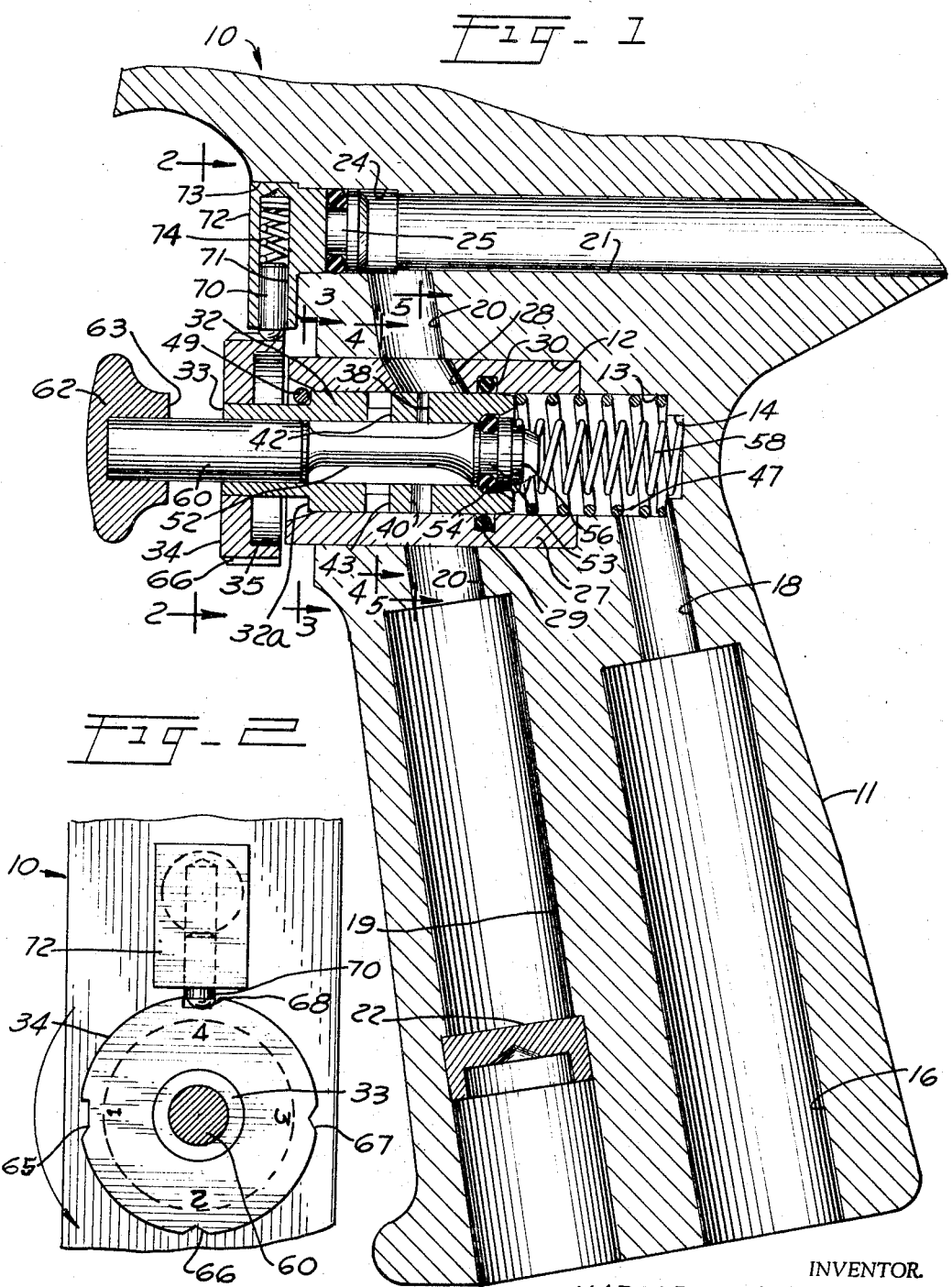

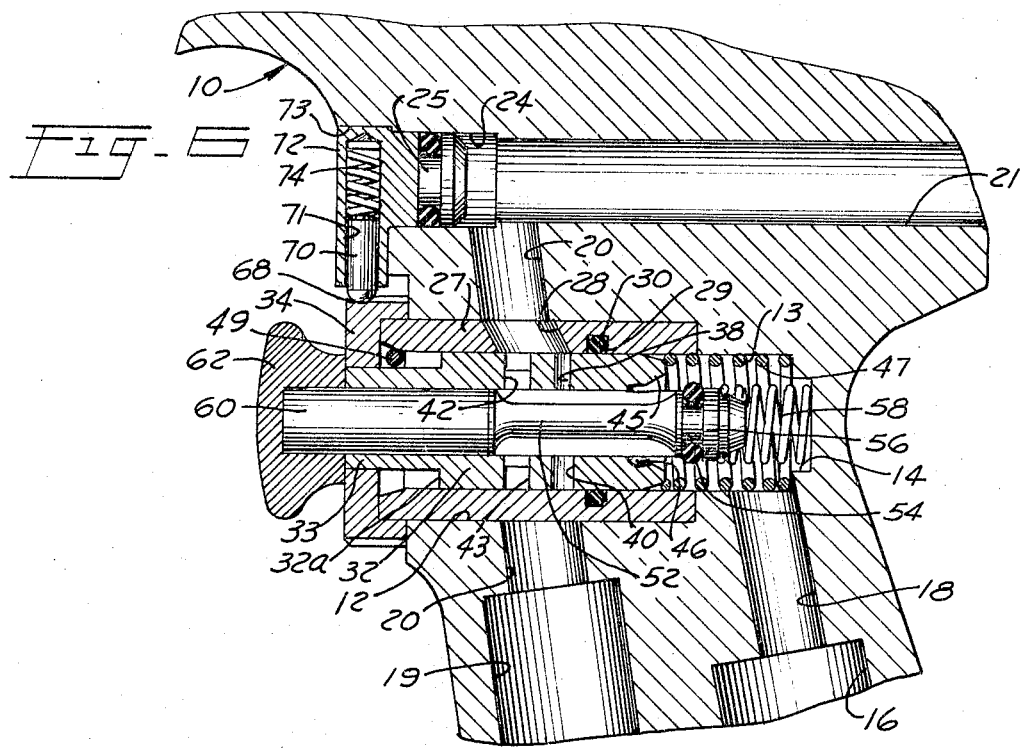
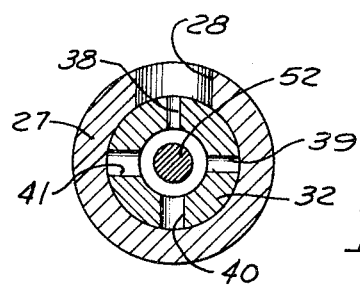
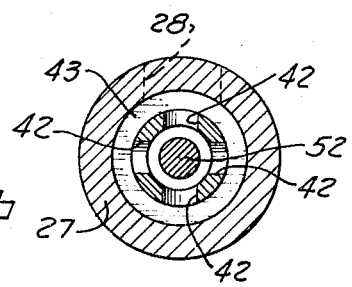
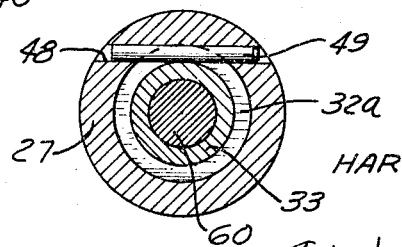
INVENTOR.
HAROLD O. McCONNAUGHAY
BY
ATTORNEYS United States Patent Office 3,326,240
Patented June 20, 1967

This invention relates generally to controls for fluid operated devices, and more particularly to a trigger-type regulator and control for a fluid operated device, such as a pneumatic motor for a power tool.

A primary object of the present invention is the provision of a trigger-type control for a fluid operated device, which control includes fluid by-pass means operated by the same member used to start and stop the flow of fluid to the fluid operated device.

Another object of the present invention is the provision of a trigger-type control which is adapted to act as a throttle valve, regulator and by-pass valve.

A further object of the present invention is the provision of a trigger-type control valve of the type described which has a minimum number of parts and which is durable and trouble free in operation.

These and other objects and advantages of the present invention will become apparent from the following specification disclosing a preferred embodiment of the invention which is illustrated in the accompanying drawings.

In the drawings:

FIG. 1 is a partial sectional view taken through a pistol-grip handle of a pneumatically operated power tool which incorporates the regulator and control of the present invention, which view shows the regulator and control in its closed position;

FIG. 2 is a section taken along line 2—2 of FIG. 1;

FIG. 3 is a section taken along line 3—3 of FIG. 1 with only the parts of the regulator and control being shown;

FIG. 4 is a section taken along line 4—4 of FIG. 1 with only the parts of the regulator and control being shown;

FIG. 5 is a section taken along line 5—5 of FIG. 1 with only the parts of the regulator and control being shown; and FIG. 6 is a section similar to FIG. 1 showing the regulator and control in the by-pass position.

Now referring to FIG. 1, a fluid operated, hand manipulable power tool generally designated 10 includes a depending pistol-grip hand portion 11. The power tool may be of the rotary impact type as disclosed in copending Kaman et al. application, Ser. No. 222,868, filed Sept. 11, 1962 now Patent No. 3,228,486. This particular power tool is mentioned only for purpose of illustrating the invention and not for limiting the same in any way. Hand-grip 11 includes coaxial stepped bores 12, 13 and 14. The handle further includes a generally axially extending passageway 16 which opens at one end thereof at the base of the handle and which communicates at the other end thereof with a reduced-in-diameter passageway 18. Passageway 18 opens into bore 13. Handle 11 also includes a passageway 19 generally parallel with the passageway 16 and opening at one end thereof at the base of the handle. The other end of passageway 19 communicates with a reduced-in-diameter passageway 20, which passageway intersects bore 12 and communicates at its inner end with a further passageway 21. Passageway 19 is provided merely to accommodate the tool which forms passageway 20. Passageway 19 is closed off by a suitable plug 22.

Passageway 21 leads to the pneumatic motor of the tool; this passageway along with the portion of passageway 20 between bore 12 and passageway 21 may be termed as fluid outlet passageways. Passageway 21 has an enlarged portion 24 closed by a suitable plug 25.

Passageways 16 and 18 may be termed fluid inlet passageways. Fluid under pressure, such as compressed air, is admitted into passageway 16. This passageway may have a suitable tube (not shown) press fitted therein, which tube includes at the outer end thereof suitable coupling means for engagement with a fluid conduit extending to the source of fluid pressure.

An outer sleeve 27 is secured in bore 12 as by means of a press fit, for example. Sleeve 27 includes a generally radially extending passageway 28, which passageway registers with passageway 20 and forms part of the fluid outlet passageways. Sleeve 27 also includes an internal annular groove 29 having an O-ring 30 received therein.

An inner sleeve 32 is rotatably and slidably received within sleeve 27. A fluid-tight seal is formed between the two sleeves by means of O-ring 30. Sleeve 32 includes a reduced-in-diameter hub 33 at its outer end on which is fixed a dial wheel 34 best seen in FIG. 2. Rotation of the dial wheel brings about correponding rotation of sleeve 32. Dial wheel 34 includes an annular recess 35 adapted to receive the outer end of sleeve 27 when sleeve 32 is moved axially as will be explained hereinbelow.

As best seen in FIG. 5, sleeve 32 includes a first set of ports defined by a plurality of circumferentially spaced, radially extending ports 38, 39, 40 and 41. Ports 38-41 progressively increase in diameter in a clockwise direction as viewed in FIG. 5.

As noted in FIG. 4, sleeve 32 includes a second set of ports defined by a plurality of circumferentially spaced, radially extending ports 42. Ports 42, which may be of the same diameter, open at their outer ends into an annular groove 43 formed in the outer surface of sleeve 32.

The inner end of sleeve 32 is defined by an inner conical surface 45 opening into an inner annular groove 46, which groove is rounded in cross section for serving as a valve seat. A spring 47, which is optional as will be explained below, has one end thereof in engagement with the inner end of bore 13 and the other end thereof in engagement with the inner end of sleeve 32 for urging the latter outwardly.

As seen in FIG. 3, sleeve 27 is provided with a transverse bore 48 which is offset from the longitudinal central axis from the sleeve. A pin 49 is snugly received in bore 48 for being engaged by an annular shoulder 32a formed on sleeve 32 at its juncture with hub 33. Pin 49 acts as a stop for limiting outward movement of sleeve 32.

A valve stem 52 has an enlarged inner end 53 provided with a suitable annular groove having an O-ring 54 received therein. When the valve stem is in its closed position as illustrated in FIG. 1, O-ring 54 is received in groove 46 of sleeve 32 for providing a fluid-tight seal at the inner end of the latter. Valve stem 52 further includes at its inner end a reduced-in-diameter projection 56 which receives one end of a coil spring 58. The other end of spring 58 is received in bore 14. Manifestly, spring 58 acts to seat the enlarged end of valve stem 52 in the inner end of sleeve 32 and thereby acts to hold the latter against the stop means defined by pin 49.

Valve stem 52 is defined at its other end by an enlarged cylindrical portion 60 which is slidable in sleeve 32 and which projects outwardly of the outer end of the sleeve.
A trigger button 62 adapted to be comfortably engaged by a person's finger is secured to the outer end of valve stem portion 60. Button 62 includes an annular shoulder 63 adapted to abut the end of hub 33 and the face of dial wheel 34 upon depressing the valve stem by squeezing button 62 by the finger of the operator of the tool.

As noted in FIG. 2, dial wheel 34 is provided with circumferentially spaced numerical indicia for indicating the rotary or angular position of the sleeve. Each number forming a part for the indicia corresponds to one of ports 38–41. For purposes of illustration, let it be assumed that numerical "4" corresponds with port 38. Numerical "4" is shown in the 12 o'clock position in FIG. 2, and accordingly sleeve 32 is angularly positioned so that port 38 is also in the vertical or 12 o'clock position. Ports 38–41, which are co-planar, are located axially of sleeve 32 so that a port selected by dial wheel 34 registers with outlet passageway 28.

It should be apparent that dial wheel 34 serves as a means for bringing a selected port of ports 38–41 into registration with the outlet passageways. As these ports are of different diameters, the speed of the motor controlled by the device of the present invention may be varied. Manifestly, the speed of the motor will be increased as the larger diameter ports are brought into registration with the fluid outlet passageways. Sleeve 32 operated by dial wheel 34 not only serves as a convenient means to permit an operator to change the speed of the tool motor, this sleeve with its ports of different diameters also provides a means for compensating for variations in the pressure of the fluid being supplied to the power tool. For example, if the air compressor supplying air to the tool is set at a higher than normal pressure which brings about too rapid operation of the tool, sleeve 32 may be rotated by dial wheel 34 to cause the flow of fluid to pass through one of the smaller diameter ports of ports 38–41 for reducing the speed of the tool motor.

Preferably, means are provided for releasably holding a selected port of ports 38–41 in registration with the fluid outlet passageways. As best seen in FIG. 2, such means are defined in part by a plurality of circumferentially spaced detents 65–68 formed in the periphery of dial wheel 34. A pin 70 has a rounded end thereof adapted to be received in a selected detent. Pin 70 is slidably received in a blind bore 71 formed in a block 72, which block is fitted in a complementary shaped recess 73 formed in the handle of the power tool. A spring 74 is contained within bore 71 for urging the rounded end of pin 70 in contact with the periphery of dial wheel 34. As noted in FIG. 2, detents 65 and 68 have faces at right angles for preventing a full rotation of the dial wheel. In other words, dial wheel 34 may only be rotated 270° between the "1" and "4" positions.

The operation of the regulator and control of this invention is as follows:

Assume that a supply of fluid under pressure, such as compressed air, is admitted into inlet passageways 16 and 18. When the regulator and control is in its normal operating position, the various parts are in the position illustrated in FIG. 1. The incoming fluid, which is admitted into bores 13 and 14, is prevented from entering sleeve 32 as the inner end of the latter is sealed by the enlarged end of valve stem 52 which is seated in the inner end of sleeve 32. Depressing of valve stem 52, as by engagement of button 62 by an operator's finger, unseats O-ring 54 of the valve stem from groove 46 of sleeve 32 and thereby allows the incoming fluid to enter the annular space defined by the valve stem and the interior of sleeve 32. As long as sleeve 32 is not moved axially by engagement of shoulder 63 of button 62, annular groove 43 of sleeve 32 is completely sealed off by the inside wall of outer sleeve 27; only a selected port of ports 38–41 communicates with outlet passageways 28, 20 and 21. Therefore, when only the valve stem itself is moved axially, the fluid under pressure is admitted to the motor through a selected port of ports 38–41. As explained above, the speed of the motor may be varied or controlled by rotating dial wheel 34 to bring a selected port of ports 38–41 in registration with outlet passageways 28, 20 and 21.

As mentioned above, the regulator and control of this invention may be incorporated in a pneumatically operated rotary impact tool. As is well known to those skilled in the art, a tool of this type is primarily used for running nuts and the like. Assume that such a tool is being used to remove a nut which is "frozen" to such a degree that an extremely high torque must be developed in the motor of the tool to release the nut. In such a case, the operator of the tool need only depress button 62 as far as possible. In depressing button 62 in this manner, shoulder 63 of the latter engages the end of hub 33 of sleeve 32 and moves the latter inwardly of the handle so that annular groove 43 communicates with passageway 28 (FIG. 6). This permits a maximum flow of fluid to the tool motor for developing maximum torque in the latter. When sleeve 32 is positioned as just described, the incoming fluid flows simultaneously through all of ports 42 and then into annular groove 43 for entry into the outlet passageways. As noted in FIG. 6, the selected port of ports 38–41 remains in communication with outlet passageway 28 when annular groove 43 is in communication with this outlet passageway. In effect, ports 42 and annular groove 43 serve as a by-pass although the incoming fluid still flows through the selected port of ports 38–41.

It should be noted that detents 65–68 of the dial wheel are of sufficient length axially of the latter so that the selected detent remains in engagement with the rounded end of pin 70 upon axial movement of dial wheel 34 and sleeve 32. In other words, axial movement of sleeve 32 for bringing about maximum flow in no way affects the rotary or angular position of the sleeve.

It will be apparent that fluid under pressure in bores 13 and 14 acts on the inner end of sleeve 32 for holding flange 32a of the latter in contact with pin 49. Therefore, when only valve stem 52 is moved inwardly for unseating O-ring 54, sleeve 32 is held in its normal position by the action of fluid pressure. Accordingly, spring 47 may be dispensed with without affecting the operation of the regulator and control of this invention.

It should be apparent that the regulator and control of this invention serves as a throttle valve, regulator and by-pass valve. The by-pass is brought into operation merely by depressing button 62 to its fullest extent. In other words, no separate levers or operating devices need be manipulated to bring the by-pass valve feature of the regulator and control into operation.

While the invention has been shown in but one form, it will be obvious to those skilled in the art that it is not to be so limited. On the contrary, the invention is susceptible of various forms and modifications without departing from the spirit and scope of the appended claims.

I claim:

1. A trigger-type regulator and control for a fluid operated device comprising, a member having a bore adapted adjacent one end thereof to communicate with fluid inlet passageway means and having fluid outlet passageway means intermediate the ends thereof, a sleeve slidably mounted in said bore, said sleeve normally being in a first axial position relative to said bore, said sleeve having first radial port means which communicate with said outlet passageway means when the sleeve is in its first axial position, said sleeve having second radial port means spaced axially of the first port means such that upon axial movement of the sleeve in one direction the second radial port means is brought into communication with said outlet passageway means, which second port means has a greater cross-sectional area than the first port means, a valve stem reciprocal in said sleeve and having one enlarged end thereof adjacent the end of the sleeve corresponding to said one end of the bore, resilient means urging said valve stem in a direction opposite said one direction for seating said enlarged end of the valve stem in the corresponding end of the sleeve, the other end of said valve stem projecting outwardly of said sleeve and bore and having a configuration for engagement by the finger of a person, the configuration on said valve stem being adapted upon movement of the latter in said one direction to engage the other end of said sleeve after said enlarged end of the valve stem is unseated so that continued movement of the valve stem in the same direction brings about corresponding movement of the sleeve for communicating said second port means with said outlet passageway means.

2. The regulator and control according to claim 1 wherein said sleeve is rotatable in said bore and wherein said first port means include a plurality of circumferentially spaced, radially extending ports, said ports each having a different diameter, means for rotating said sleeve to a selected angular position for bringing a selected port into registry with said fluid outlet passageway.

3. The regulator and control according to claim 1 wherein said second port means includes a plurality of circumferentially spaced, radially extending ports which open into an annular groove formed in the outer surface of said sleeve.

4. The regulator and control according to claim 1 wherein the relationship of the diameter of said outlet passageway with respect to the spacing between said first and second port means axially of the sleeve is such that the first and second port means may be in simultaneous communication with the outlet passageway means.

5. A trigger type regulator and control for a fluid operated device comprising, a member including a blind bore having the inner end thereof in communication with fluid inlet passageway means and having fluid outlet passageway means intermediate the ends thereof, a sleeve slidably mounted in said bore, said sleeve normally being in a first axial position relative to said bore with the inner end of the sleeve in spaced relation with the inner end of said blind bore, said sleeve having first radial port means which communicate with said outlet passageway means when the sleeve is in its first axial position, said sleeve having second radial port means spaced axially of the first port means such that upon axial movement of the sleeve in one direction the second radial port means is brought into communication with said outlet passageway means, which second port means has a greater cross sectional area than the first port means, stop means for limiting axial movement of the sleeve in a direction opposite said one direction, a valve stem reciprocal in said sleeve and having one enlarged end thereof adjacent said inner end of the sleeve, resilient means urging said valve stem in said opposite direction for seating said enlarged end of the valve stem in the inner end of the sleeve and thereby holding the sleeve against said stop means, the other end of said valve stem projecting outwardly of said sleeve and bore and having a configuration for engagement by the finger of a person, the configuration of said valve stem being adapted, upon movement of the latter in said one direction, to engage the other end of said sleeve after said enlarged end of the valve stem is unseated so that continued movement of the valve stem in the same direction brings about corresponding movement of the sleeve for communicating said second port means with said outlet passageway means, said sleeve being held in its first axial position, after unseating of the valve stem and before engagement by said configuration, by the action of fluid acting on the inner end of the sleeve.

No references cited.

CLARENCE R. GORDON, *Primary Examiner.*